United States Patent
Shimahashi (10) Patent No.: US 8,625,163 B2
(45) Date of Patent: Jan. 7, 2014

(54) SELECTING DITHER MATRIX BASED UPON DETERMINATION OF TONER

(75) Inventor: Takuya Shimahashi, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 335 days.

(21) Appl. No.: 13/040,446

(22) Filed: Mar. 4, 2011

(65) Prior Publication Data

US 2011/0317174 A1 Dec. 29, 2011

(30) Foreign Application Priority Data

Jun. 28, 2010 (JP) ................. 2010-146392

(51) Int. Cl.
- *G06K 15/00* (2006.01)
- *G06K 9/00* (2006.01)
- *B41J 2/385* (2006.01)

(52) U.S. Cl.
USPC ....... 358/3.13; 358/3.14; 358/3.16; 358/3.17; 358/1.9; 382/252; 347/131

(58) Field of Classification Search
None
See application file for complete search history.

(56) References Cited

U.S. PATENT DOCUMENTS

| | | | |
|---|---|---|---|
| 4,814,797 A * | 3/1989 | Haneda et al. | 347/119 |
| 6,226,021 B1 | 5/2001 | Kobayashi et al. | |
| 7,440,704 B2 | 10/2008 | Kobayashi | |
| 7,457,001 B2 * | 11/2008 | Walmsley | 358/1.9 |
| 7,746,502 B2 * | 6/2010 | Yasutomi et al. | 358/3.13 |
| 7,973,976 B2 | 7/2011 | Yamakado | |
| 2004/0218221 A1 | 11/2004 | Hirano et al. | |
| 2005/0219628 A1 | 10/2005 | Yasutomi et al. | |
| 2006/0051108 A1 | 3/2006 | Kobayashi | |
| 2007/0019241 A1 | 1/2007 | Yamakado | |
| 2009/0027704 A1 * | 1/2009 | Kobayashi | 358/1.9 |

(Continued)

FOREIGN PATENT DOCUMENTS

| | | |
|---|---|---|
| CN | 1557090 A | 12/2004 |
| CN | 101223770 A | 7/2008 |

(Continued)

OTHER PUBLICATIONS

Chinese Official Action dated Jul. 31, 2013 received in related application CN 201110076958.5.

(Continued)

*Primary Examiner* — Steven Kau (74) *Attorney, Agent, or Firm* — Scully, Scott, Murphy & Presser, P.C.

(57) ABSTRACT

A dither matrix selecting device includes a storage unit, a determining unit, and a selecting unit. The storage unit is configured to store a first dither matrix and a second dither matrix different from the first dither matrix. The first dither matrix includes a plurality of sub-matrices. Each sub-matrix of the first dither matrix has a plurality of threshold values such that a single dot grows from a starting pixel as an input value increases. Each sub-matrix has a first region and a second region different from the first region. Each threshold value allocated in the first region is smaller than a prescribed value. An arrangement of each threshold value in the first region is identical for all of the plurality of sub-matrices. The determining unit is configured to determine whether or not toner accommodated in a printing device is a specified toner. The selecting unit is configured to select the first dither matrix when the determining unit determines that the toner is not the specified toner.

11 Claims, 6 Drawing Sheets

(56) References Cited

U.S. PATENT DOCUMENTS

2009/0059254 A1* 3/2009 Kobayashi .................. 358/1.9
2009/0097043 A1  4/2009 Gotoh
2010/0182621 A1* 7/2010 Yamada ..................... 358/1.9

FOREIGN PATENT DOCUMENTS

| JP | H6-164908 A | 6/1994 |
|---|---|---|
| JP | 11-286132 | 10/1999 |
| JP | 2002-331686 | 11/2002 |
| JP | 2005-192195 | 7/2005 |
| JP | 2006-78716 A | 3/2006 |
| JP | 2006-218803 | 8/2006 |
| JP | 2009-100121 | 5/2009 |
| WO | 02/02339 A1 | 1/2002 |

OTHER PUBLICATIONS

Japanese Official Action dated Aug. 6, 2013 received in related application JP 2010-146392.

* cited by examiner

INPUT VALUE = 30

FIG.5(b)

INPUT VALUE = 48

FIG.5(c)

INPUT VALUE = 106

FIG.6

SELECTING DITHER MATRIX BASED UPON DETERMINATION OF TONER

CROSS REFERENCE TO RELATED APPLICATION

This application claims priority from Japanese Patent Application No. 2010-146392 filed Jun. 28, 2010. The entire content of the priority application is incorporated herein by reference.

TECHNICAL FIELD

The present invention relates to a dither matrix selecting device.

BACKGROUND

One type of printing device well known in the art converts multi-tone image data to binary image data using a dither matrix and forms a binary image with toner based on the binary image data. This type of printing device generally uses a clustered-dot dither matrix having a plurality of sub-matrices (basic matrices) with threshold values set so that a single dot grows from a starting pixel in each sub-matrix as the input value increases.

SUMMARY

However, this type of printing device is designed to achieve maximum performance using a prescribed toner with known properties (normally a proprietary toner product provided by the manufacturer of the printing device and referred to as the "original manufacturer's product"). Hence, using a non-prescribed toner in the printing device may result in less stable dot formation than when using the prescribed toner, producing patterns and unevenness in the printed image and other artifacts that can worsen printing quality.

In view of the foregoing, it is an object of the present invention to minimize a worsening in the quality of printed images caused by using a non-prescribed toner.

In order to attain the above and other objects, the invention provides a dither matrix selecting device including a storage unit, a determining unit, and a selecting unit. The storage unit is configured to store a first dither matrix and a second dither matrix different from the first dither matrix. The first dither matrix includes a plurality of sub-matrices. Each sub-matrix of the first dither matrix has a plurality of threshold values such that a single dot grows from a starting pixel as an input value increases. Each sub-matrix has a first region and a second region different from the first region. Each threshold value allocated in the first region is smaller than a prescribed value. An arrangement of each threshold value in the first region is identical for all of the plurality of sub-matrices such that dots corresponding to all sub-matrices grow simultaneously as the input value increases. The threshold values in the second region are arranged such that dots grow sequentially and nonsimulteneously as the input value increases. The determining unit is configured to determine whether or not toner accommodated in a printing device is a specified toner. The selecting unit is configured to select the first dither matrix when the determining unit determines that the toner is not the specified toner.

According to another aspect, the present invention provides a method executed by a dither matrix selecting device, the method comprising: determining whether or not toner accommodated in a printing device is a specified toner; and selecting a first dither matrix among a plurality of dither matrices when the toner is not the specified toner, the first dither matrix including a plurality of sub-matrices, each sub-matrix of the first dither matrix having a plurality of threshold values such that a single dot grows from a starting pixel as an input value increases, each sub-matrix having a first region and a second region different from the first region, each threshold value that is allocated in the first region being smaller than a prescribed value, an arrangement of each threshold value in the first region being identical for all of the plurality of sub-matrices.

According to another aspect, the present invention provides a non-transitory computer readable storage medium storing a set of program instructions installed on and executed by a computer, the program instructions comprising: determining whether or not toner accommodated in a printing device is a specified toner; and selecting a first dither matrix among a plurality of dither matrices when the toner is not the specified toner, the first dither matrix including a plurality of sub-matrices, each sub-matrix of the first dither matrix having a plurality of threshold values such that a single dot grows from a starting pixel as an input value increases, each sub-matrix having a first region and a second region different from the first region, each threshold value that is allocated in the first region being smaller than a prescribed value, an arrangement of each threshold value in the first region being identical for all of the plurality of sub-matrices.

BRIEF DESCRIPTION OF THE DRAWINGS

The particular features and advantages of the invention as well as other objects will become apparent from the following description taken in connection with the accompanying drawings, in which:

FIG. 2 is an explanatory diagram showing an example of a standard dither matrix;

FIG. 3(*a*) is a graph showing voltage changes over a surface of a photosensitive drum when forming two isolated dots;

FIG. 3(*b*) is a graph showing voltage changes over a surface of a photosensitive drum when forming a dot having a plurality of consecutive pixels;

FIG. 4 is an explanatory diagram showing an example of a simultaneous growth dither matrix;

FIG. 5(*a*) is an explanatory diagram showing a dot formation formed by using the simultaneous growth dither matrix shown in FIG. 4 when an input value is 30;

FIG. 5(*b*) is an explanatory diagram showing a dot formation formed by using the simultaneous growth dither matrix shown in FIG. 4 when an input value is 48;

FIG. 5(*c*) is an explanatory diagram showing a dot formation formed by using the simultaneous growth dither matrix shown in FIG. 4 when an input value is 106.

DETAILED DESCRIPTION

Next, a preferred embodiment of the present invention will be described while referring to the accompanying drawings.

Figure 1:
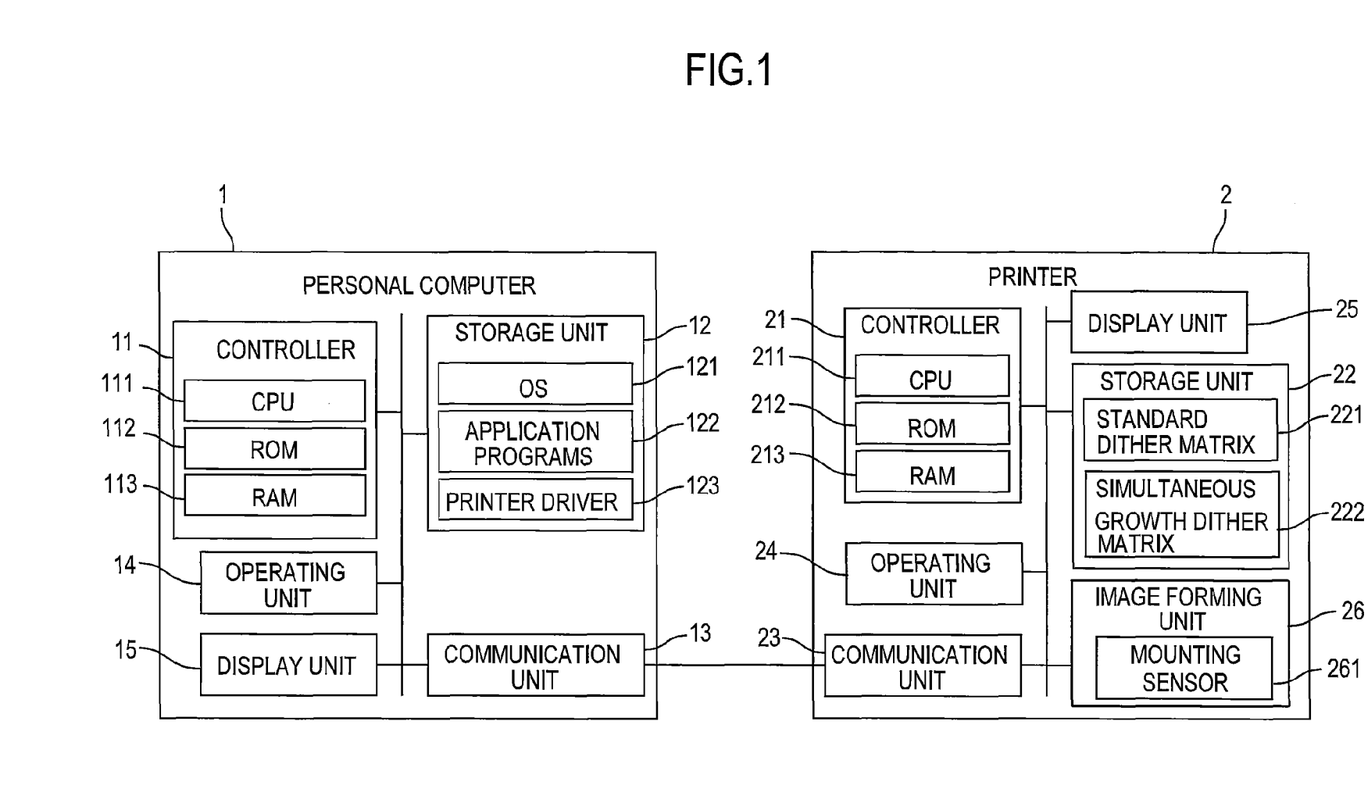
FIG. 1 is a block diagram showing a printing device and a dither matrix selecting device according to an embodiment of the present invention.

FIG. 1 is a block diagram showing the general structure of a communication system including a personal computer (PC) 1, and a printer 2 that are capable of performing data communications with each other.

The PC 1 is a common data processor that includes a controller 11, a storage unit 12, a communication unit 13, an operating unit 14, and a display unit 15. The controller 11 performs overall control of each component in the PC 1. The controller 11 includes a CPU 111, a ROM 112, and a RAM 113.

The storage unit 12 is a nonvolatile storage device for storing data that can be overwritten. In this embodiment, a hard disk drive is employed as the storage unit 12. Various software programs are installed on the storage unit 12, including an operating system (OS) 121; application programs 122 for implementing graphical program and other applications (so-called software); and a printer driver 123 for enabling a user to use the printer 2 through the personal computer 1.

The communication unit 13 is an interface for performing data communications with the printer 2. The operating unit 14 is an input device that allows the user to input instructions through external operations. In this embodiment, the operating unit 14 is configured of a keyboard and a pointing device (a mouse, touchpad, or the like). The display unit 15 is an output device for displaying various data in a visual form that the user can understand. In this embodiment, the display unit 15 is configured of a liquid crystal display.

The printer 2 is an electrographic-type image forming device including a controller 21, a storage unit 22, a communication unit 23, an operating unit 24, a display unit 25, and an image forming unit 26.

Figure 6:
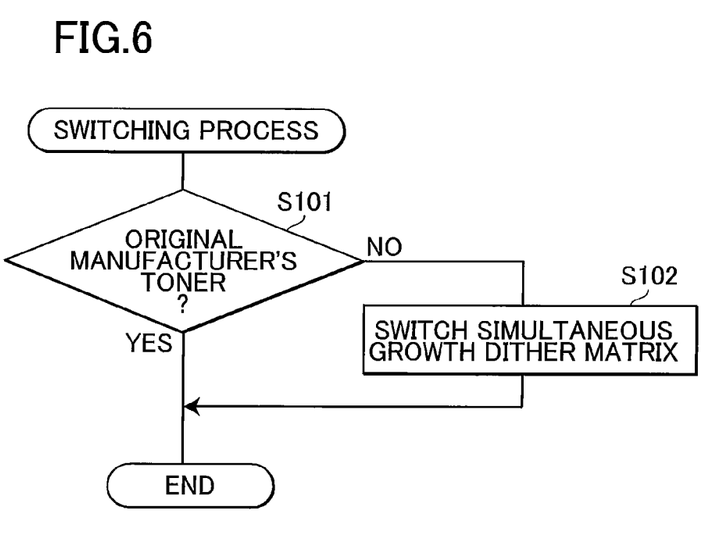
FIG. 6 is a flowchart illustrating steps in a dither matrix switching process executed by the dither matrix selecting device.

The controller 21 performs overall control of each component in the printer 2. The controller 21 includes a CPU 211, a ROM 212, and a RAM 213. The ROM 212 stores a program for controlling the CPU 211 to perform a dither switching process described below (FIG. 6).

The storage unit 22 is a nonvolatile storage device for storing data that can be overwritten. In this embodiment, flash memory is employed as the storage unit 22. Candidates for a dither matrix to be used in a thresholding process (hereinafter referred to as the "active dither matrix") are stored in the storage unit 22 and include a standard dither matrix 221, and a simultaneous growth dither matrix 222 in this embodiment. The standard dither matrix 221 is a conventional clustered-dot dither matrix such as that shown in FIG. 2 and has threshold values set for reproducing the best quality image when using the original manufacturer's toner having known properties (where the original manufacturer's toner is a product supplied by the manufacturer of the printer 2). The simultaneous growth dither matrix 222 shown in FIG. 4 is used when toner other than the original manufacturer's toner (a third party toner) is loaded in the printer 2, and will be described later in greater detail.

The communication unit 23 is an interface for performing data communications with the PC 1. The operating unit 24 is an input device that allows the user to input instructions through external operations. The operating unit 24 includes various operating buttons.

The display unit 25 is an output device and includes a small liquid crystal display for displaying various data as images that convey information to the user. The image-forming unit 26 functions to form monochrome images by fixing toner to paper. More specifically, the image-forming unit 26 irradiates a laser beam onto the uniformly charged surface of a photosensitive drum based on binary image data in order to form an electrostatic latent image of the binary image. Next, the image-forming unit 26 deposits toner on the electrostatic latent image to form a toner image. The image-forming unit 26 transfers this toner image onto a sheet of paper, and further fixes the toner image to the paper by heat in a fixing unit to complete the image-forming (printing) process.

The printer 2 according to this embodiment employs a toner cartridge that is detachably mounted in the body of the printer 2. The toner cartridge accommodates toner and can be replaced by the user as needed. An IC chip is attached to the original manufacturer's toner cartridge provided by the manufacturer of the printer 2. The IC chip stores information indicating that the toner cartridge is the original manufacturer's product. The control unit 21 of the printer 2 can determine whether this toner cartridge is the original manufacturer's product by reading the information stored in the IC chip attached to the mounted toner cartridge. The image-forming unit 26 also includes a mounting sensor 261 for detecting when the toner cartridge is mounted in the body of the printer 2.

Next, an outline of the process executed by the printing system according to this embodiment will be described.

When the user of the personal computer 1 performs an operation to initiate a printing process in one of the application programs 122 executing on the personal computer 1, such as a graphics tool, the personal computer 1 activates the printer driver 123 to transfer a print job to the printer 2. Here, a print job is a command to print 256-level image data representing the image to be printed.

When the printer 2 receives a print job from the personal computer 1, the printer 2 executes a thresholding process using a dither matrix for converting print data related to the print job into binary data. Subsequently, the printer 2 forms a binary image represented by the binary image data with toner and prints the image on paper.

The printer 2 is designed to achieve its maximum performance using the original manufacturer's toner (a polymer toner in this embodiment). Hence, if the printer 2 is using a third party toner for which the properties are unknown, problems often occur when charging or fixing the toner, making it difficult for the printer 2 to produce satisfactory printing results.

In particular, if the third party toner is a pulverized toner, dot formation may be unstable because the particle size of pulverized toner can vary greatly. Thus, the quality of images printed with this toner may be poor when the thresholding process is performed using the standard dither matrix 221 designed for use with the original manufacturer's toner. Further, with some third party pulverized toners, the fixing properties of the toner are poor in light regions (regions with low input values) of an image, but improve abruptly when the input values exceed a certain value. This is likely because the toner fixes more readily to paper when the number of pixels constituting dot clusters increases.

Figure 3A:
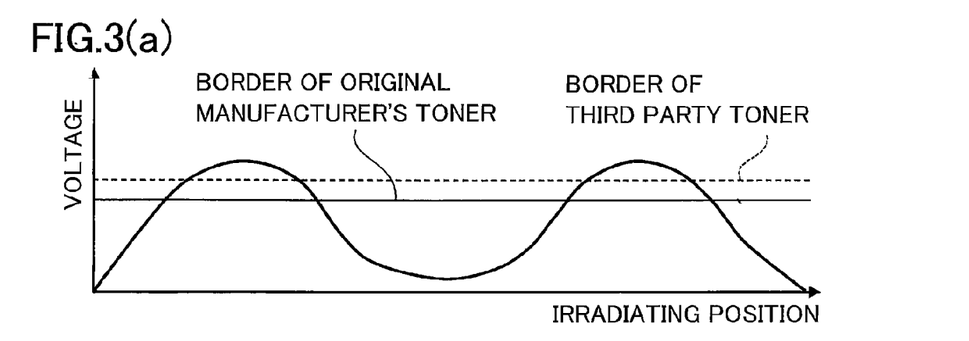

FIG. 3(a) is a graph showing voltage changes over the surface of the photosensitive drum when forming two isolated dot each corresponding to a single pixel, where the vertical axis indicates voltage and the horizontal axis indicates the irradiating position of the laser on the photosensitive drum with respect to the axial direction thereof. The horizontal lines in the graph are guidelines indicating whether a substantial amount of toner is deposited. In other words, toner is more likely to be deposited when the voltage on the surface of the photosensitive drum rises above the horizontal line. As shown in FIG. 3(a), the line for the third party toner indicates a higher voltage than the line for the original manufacturer's toner and, hence, the third party toner is less likely to be deposited since the portion of the voltage that rises above the horizontal line for third party toner is smaller.

Figure 3B:
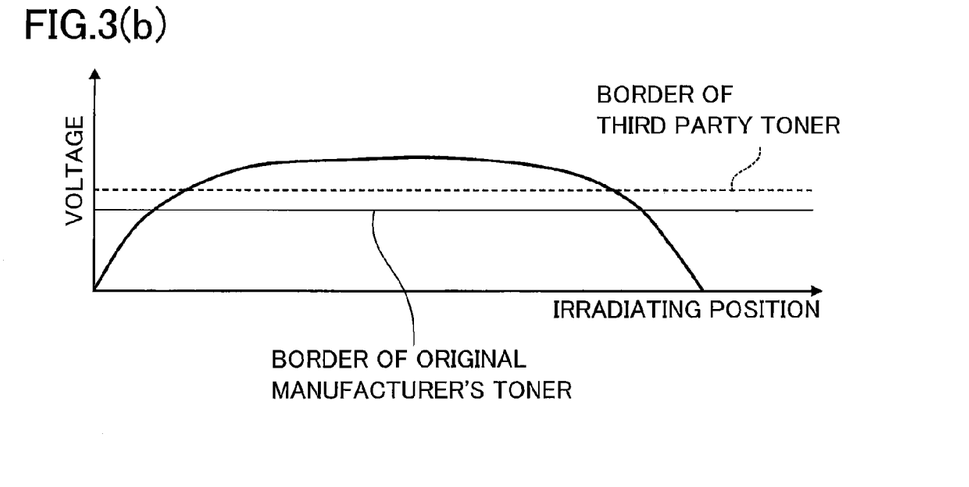

The graph in FIG. 3(b), on the other hand, shows changes in voltage on the surface of the photosensitive drum when a dot have a plurality of consecutive pixels arranged in the axial direction of the photosensitive drum. As illustrated in this graph, configuring dots with consecutive pixels produces a uniform power for the laser irradiated on the photosensitive drum, stabilizing the voltage. Accordingly, the portion of the voltage line that rises above the horizontal lines is much larger than when the dots have only a single pixel (FIG. 3(*a*)), increasing the likelihood that even the third party toner will be deposited reliably.

Hence, third party toner is particularly unlikely to be deposited in light regions of an image in which dots are configured of a small number of pixels. When using the standard dither matrix 221 for this third party toner, the light regions of the printed image will appear excessively light.

Further, threshold values are set in the standard dither matrix 221 so that dot growth alternates between certain sub-matrices. Here, a "dot" indicates an aggregate of pixels set to ON, and "dot growth" signifies a gradual increase in the number of pixels constituting the dot causing the dot to grow gradually larger. Further, "pixels set to ON" denotes pixels for which toner will be deposited. As a result, dots with different numbers of pixels (shapes) are generally combined in a regular arrangement. In the example of FIG. 2, where colored pixels indicate pixels that are ON for an input value of 43, dots having four pixels and dots having five pixels are combined in a regular arrangement. Each threshold value 1-43 is allocated in one of the plurality of sub-matrices and fails to be contained in at least one of the plurality of sub-matrices. This arrangement will cause no problems if all dots are properly formed (rendered) using the original manufacturer's toner. However, all pixels that are ON may not always be formed when using a third party toner, since the properties of the third party toner differ from those of the original manufacturer's toner and will not produce the same control and consistency designed with the original manufacturer's toner in mind. That is, there is a higher probability that dots with fewer pixels will not be formed properly than dots with more pixels. This can easily lead to regular patterns with a mixture of dots that are properly formed and dots that are not properly formed and can produce patterns and unevenness in the printed image, reducing image quality.

Therefore, when a third party toner is loaded in the printer 2 of this embodiment, the printer 2 uses the simultaneous growth dither matrix 222 shown in FIG. 4 in place of the standard dither matrix 221.

As shown in FIG. 4, like the standard dither matrix 221, the simultaneous growth dither matrix 222 is a clustered-dot dither matrix configured by a plurality of sub-matrices. Each sub-matrix has threshold values set so that a single dot grows from a starting pixel as the input value increases. Each of the standard dither matrix and simultaneous growth dither matrix 222 has threshold values set between 1 and 255 so that area gradations corresponding to input values from 0 to 255 can be rendered a plurality of tones of images without gradation jumps. In other words, each of the standard dither matrix 221 and the simultaneous growth dither matrix 222 includes a plurality of sub-matrices. Each sub-matrix has a plurality of threshold values containing the smallest threshold value. Any threshold value allocated between each of the plurality of threshold values and the smallest threshold value in each sub-matrix is smaller than or equal to the each of the plurality of threshold values. Each threshold value greater than or equal to a prescribed value 49 is allocated in a region of one of the plurality of sub-matrix and is not contained in at least one of the plurality of sub-matrices.

Figure 5A:
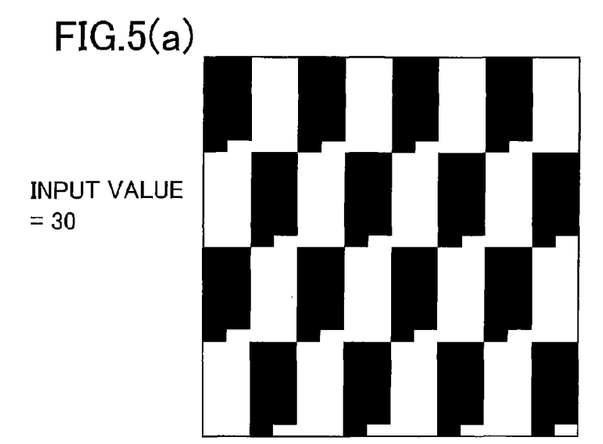
Figure 5B:
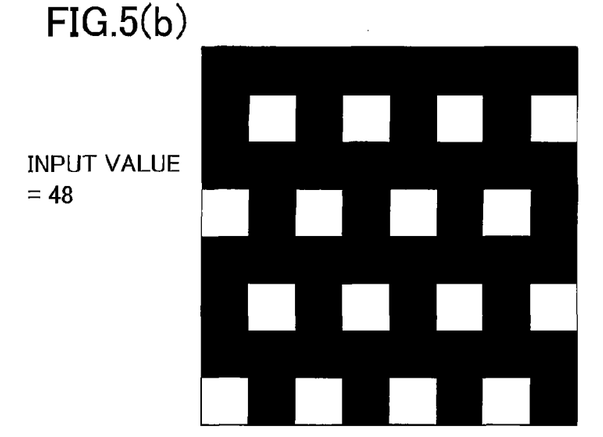

However, the simultaneous growth dither matrix 222 differs from the standard dither matrix 221 in that all sub-matrices share the same settings for threshold values between 1 and 48. Specifically, each threshold value (1-48) smaller than the prescribed value (49) is allocated in another region different from the allocated region of the threshold value 49-255. An arrangement of each threshold value (1-48) smaller than the prescribed value (49) is identical for all of the plurality of sub-matrices. In other words, threshold values are set in the simultaneous growth dither matrix 222 so that the dots in all sub-matrices grow simultaneously and in the same shape for input values up to 48, as illustrated in FIGS. 5(*a*) and 5(*b*). FIG. 5(*a*) shows the dots formed for the input value 30, and FIG. 5(*b*) for the input value 48. For all other input values less than 48, the dots are similarly formed in the same shape in all sub-matrices.

Figure 5C:
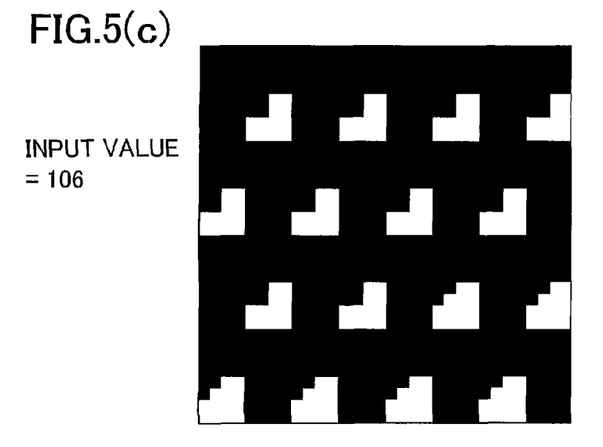

However, the threshold values are set in the storage unit 22 so that dot growth begins to alternate between certain sub-matrices for input values above 48, as illustrated in FIG. 5(*c*). As described earlier, third party toner often has poor fixing properties in light regions of an image, but these fixing properties often improve abruptly when the input value exceeds a certain value. In this embodiment, the simultaneous growth dither matrix 222 is designed under the assumption that 48 is the input value at which the fixing properties of third party toner change. Accordingly, threshold values are set so that dots in all sub-matrices grow simultaneously and in the same shape for input values up to 48. However, the input value 48 is merely an example.

Next, a dither matrix switching process executed by the control unit 21 of the printer 2 (and specifically the CPU 211) will be described with reference to the flowchart in FIG. 6. The control unit 21 begins the dither matrix switching process when the power to the printer 2 is switched on or when the mounting sensor 261 detects a toner cartridge being mounted while the power to the printer 2 is on (i.e., when the user performs an operation to replace the toner cartridge). The standard dither matrix 221 is set as the default active dither matrix when the power to the printer 2 is turned on.

In S101 at the beginning of this dither matrix switching process, the control unit 21 determines whether the toner cartridge currently mounted in the printer 2 is the original manufacturer's product. That is, the control unit 21 determines whether or not the toner accommodated in the printer 2 is a specified toner in S101. If the control unit 21 determines that the toner cartridge is not the original manufacturer's product (i.e., is a third party toner cartridge), in S102 the control unit 21 selects the simultaneous growth dither matrix 222 and switches the active dither matrix to the simultaneous growth dither matrix 222 from the standard dither matrix 221. Subsequently, the control unit 21 ends the dither matrix switching process and enters a standby state to wait for a print job. When the printer 2 receives a print job, the control unit 21 converts input values corresponding to the print job into output values based on the simultaneous growth dither matrix 222.

However, if the control unit 21 determines in S101 that the toner cartridge is the original manufacturer's product, the control unit 21 simply ends the dither matrix switching process with no further action. In this case, the active dither matrix remains the standard dither matrix 221.

With the printing system according to the embodiment described above, the printer 2 selects the simultaneous growth dither matrix 222 as the active dither matrix when the printer 2 is using a third party toner, where the simultaneous growth dither matrix 222 has threshold values set so that the dots in all sub-matrices grow simultaneously and in the same shape for input values up to 48. With this simultaneous growth dither matrix 222, dots in all sub-matrices always have the same number of pixels and the same shape, for input values up to 48, rather than combinations of dots with different pixel numbers (shapes). Consequently, there are unlikely to be irregularities in the size of fixed dots, preventing patterns and unevenness from being introduced into the printed image.

Further, the threshold values in the simultaneous growth dither matrix 222 are set so that dots in all sub-matrices grow simultaneously and in the same shape for input values up to 48, while dots in only some sub-matrices grow for input values exceeding 48, and the ratio of pixels set to ON in light regions of an image is higher when using the simultaneous growth dither matrix 222 than when using the standard dither matrix 221. As a result, it is possible to prevent light regions of a printed image from becoming excessively light when formed with a third party toner.

The simultaneous growth dither matrix 222 used for third party toner in this embodiment can prevent the use of this toner from worsening image quality better than the standard dither matrix 221.

Moreover, the size of the sub-matrices in the simultaneous growth dither matrix 222 required for rendering gradations is smaller than in a dither matrix having threshold values configured to grow dots in all sub-matrices simultaneously and in the same shape for all input values. Consequently, the printer 2 can form images with high resolution and good toner reproduction.

Further, since the threshold values in the simultaneous growth dither matrix 222 are set for all input values, the printer 2 can achieve good tone reproduction without gradation jumps.

While the invention has been described in detail with reference to the embodiment thereof, it would be apparent to those skilled in the art that various changes and modifications may be made therein without departing from the spirit of the invention.

For example, the standard dither matrix 221 shown in FIG. 2 and the simultaneous growth dither matrix 222 shown in FIG. 4 are merely examples, and the present invention is not limited to these dither matrices.

In the embodiment described above, the prescribed toner is the original manufacturer's toner, but the prescribed toner of the present invention is not limited to the original manufacturer's toner, provided that the toner is recommended by the manufacturer. For example, toner with known properties supplied by a manufacturer separate from the printer manufacturer may be considered a recommended toner. In this case, an IC chip storing information that indicates the toner is the prescribed (recommended) toner should be attached to the toner cartridge accommodating the recommended toner.

In the embodiment, the prescribed toner (i.e., original manufacturer's toner) is described as a polymer toner, but the present invention may be applied to a printer that uses pulverized toner as the prescribed toner, provided that the properties of the toner are known in advance.

In the example of the simultaneous growth dither matrix 222 described in the embodiment, the threshold values 1-48 are set in common cells of all sub-matrices, while threshold values greater than 48 are arranged so that dots grow only in some of the sub-matrices for each input value above 48. However, the simultaneous growth dither matrix may be configured so that all threshold values are set commonly in all sub-matrices, for example. In other words, the simultaneous growth dither matrix of the present invention may include a dither matrix with threshold values set such that dots in all sub-matrices grow simultaneously and in the same shape for all input values. Such a dither matrix is effective when printing using a third party toner having poor fixing properties for all input values.

Further, in the illustrated embodiment, the controller 21 is implemented as a programmed general purpose computer. It will be appreciated by those skilled in the art that the controller 21 can be implemented using a single special purpose integrated circuit (e.g., ASIC) having a main or central processor section for overall, system-level control, and separate sections dedicated to performing various different specific computations, functions and other processes under control of the central processor section, or a plurality of separate dedicated or programmable integrated or other electronic circuits or devices (e.g., hardwired electronic or logic circuits such as discrete element circuits, or programmable logic devices such as PLDs PLAs, PALs or the like). The controller 21 can be implemented using a suitably programmed general purpose controller, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the flowcharts shown in FIG. 6 can be used as the controller. A distributed processing architecture can be used for maximum data/signal processing capability and speed.

What is claimed is:

1. A dither matrix selecting device comprising:
a storage unit that stores a first dither matrix and a second dither matrix different from the first dither matrix therein, the first dither matrix including a plurality of sub-matrices, each sub-matrix of the first dither matrix having a plurality of threshold values such that a single dot grows from a starting pixel as an input value increases, each sub-matrix having a first region and a second region different from the first region, each threshold value that is allocated in the first region being smaller than a prescribed value, an arrangement of each threshold value in the first region being identical for all of the plurality of sub-matrices;
a processor; and
a memory storing instructions that, when executed by the processor, cause the dither matrix selecting device to:
determine whether toner accommodated in a printing device is (a) a specified toner or (b) toner other than the specified toner; and
select the first dither matrix when the toner is determined to be (b) the toner other than the specified toner.

2. The dither matrix selecting device according to claim 1, wherein each threshold value greater than or equal to the prescribed value is allocated in the second region of one of the plurality of sub-matrices and is not contained in at least one of the plurality of sub-matrices.

3. The dither matrix selecting device according to claim 1, wherein a threshold value included in the first dither matrix corresponds to each of a plurality of input values, the plurality of input values representing a plurality of tones of images.

4. The dither matrix selecting device according to claim 3, wherein the instructions, when executed by the processor, further cause the dither matrix selecting device to convert the input value to an output value based on the first dither matrix when the first dither matrix is selected.

5. The dither matrix selecting device according to claim 1, wherein the second dither matrix includes a plurality of sub-matrices, each sub-matrix of the second dither matrix having a plurality of threshold values containing a smallest threshold value, any threshold value that is allocated between each of the plurality of threshold values and the smallest threshold value in each sub-matrix being smaller than or equal to the each of the plurality of threshold values, each threshold value that is smaller than a predetermined value being allocated in one of the plurality of sub-matrices of the second dither matrix and failing to be contained in at least one of the plurality of sub-matrices of the second dither matrix.

6. The dither matrix selecting device according to claim 1, wherein each sub-matrix of the first dither matrix has the plurality of threshold values containing a smallest threshold value, any threshold value that is allocated between each of the plurality of threshold values and the smallest threshold value in each sub-matrix being smaller than or equal to the each of the plurality of threshold values.

7. The dither matrix selecting device according to claim 1, wherein the specified toner is an original manufacturer's toner and the toner other than the specified toner is toner other than the original manufacturer's toner.

8. A method executed by a dither matrix selecting device, the method comprising:
  determining whether toner accommodated in a printing device is (a) a specified toner or (b) toner other than the specified toner; and
  selecting a first dither matrix among a plurality of dither matrices when the toner is determined to be (b) the toner other than the specified toner, the first dither matrix including a plurality of sub-matrices, each sub-matrix of the first dither matrix having a plurality of threshold values such that a single dot grows from a starting pixel as an input value increases, each sub-matrix having a first region and a second region different from the first region, each threshold value that is allocated in the first region being smaller than a prescribed value, an arrangement of each threshold value in the first region being identical for all of the plurality of sub-matrices.

9. The method according to claim 8, wherein the specified toner is an original manufacturer's toner and the toner other than the specified toner is toner other than the original manufacturer's toner.

10. A non-transitory computer readable storage medium storing a set of program instructions installed on and executed by a computer, the program instructions comprising:
  determining whether toner accommodated in a printing device is (a) a specified toner or (b) toner other than the specified toner; and
  selecting a first dither matrix among a plurality of dither matrices when the toner is determined to be (b) the toner other than the specified toner, the first dither matrix including a plurality of sub-matrices, each sub-matrix of the first dither matrix having a plurality of threshold values such that a single dot grows from a starting pixel as an input value increases, each sub-matrix having a first region and a second region different from the first region, each threshold value that is allocated in the first region being smaller than a prescribed value, an arrangement of each threshold value in the first region being identical for all of the plurality of sub-matrices.

11. The computer readable storage medium according to claim 10, wherein the specified toner is an original manufacturer's toner and the toner other than the specified toner is toner other than the original manufacturer's toner.

* * * * *